Oct. 13, 1970   N. KLIMMEK ET AL   3,533,156
TAPERED WORKPIECE METHOD AND MEANS
Filed April 23, 1968   2 Sheets-Sheet 1

INVENTORS
NORMAN KLIMMEK
JOSEPH MELILL
BY RONALD D. BRUNKEN

ATTORNEY

INVENTORS
NORMAN KLIMMEK
JOSEPH MELILL
RONALD D. BRUNKEN
BY
ATTORNEY

United States Patent Office 3,533,156
Patented Oct. 13, 1970

1

3,533,156
TAPERED WORKPIECE METHOD AND MEANS
Norman Klimmek, Palos Verdes Estates, Joseph Melill, Rolling Hills Estates, and Ronald D. Brunken, Inglewood, Calif., assignors to North American Rockwell Corporation, El Segundo, Calif.
Filed Apr. 23, 1968, Ser. No. 723,489
Int. Cl. B23k 31/02
U.S. Cl. 29—472.1          6 Claims

ABSTRACT OF THE DISCLOSURE

Tapered metallic workpieces in panel or slab form are fabricated by solid state roll diffusion bonding a stack of progressively shorter sheets together supported by filler metal members in a closely confined workpack. Reinforcing webs or ribs may be optionally formed on the workpiece simultaneously during the same rolling operation, using tapered mandrels or filler pieces preplaced in the workpack.

BACKGROUND

Four dominant methods are currently known to the prior art and used in industry for fabricating elongate slabs or panels having tapered thickness throughout their length. The first method comprises passing billets through canted rolls as used in rolling mills. This results in nonuniform tretching of workpiece material across the width of the sheet, causing the sheet to bend sideways as it passes between the rollers.

The second method comprises reduction rolling of two preformed thin tapered billets, each having a machined surface to produce the desired initial tapered thickness. The billet sheets are secured together to form a workpack of uniform thickness and are simultaneously rolled in a plurality of passes to reduce the thickness and elongate the sheets a desired amount. Surface machining of thin billets to produce a substantially uniformly decreasing rate of thickness taper is extremely tedious, costly and difficult to control with regard to dimensional accuracy, especially in hard metals or alloys highly resistant to cutting or grinding operations.

The third method comprises the machining of a surface on a plate or billet of initially uniform thickness in order to produce the desired tapered thickness in the finished workpiece. As previously noted, this method is slow and costly. Moreover, this method is not feasible where thin gages are involved, or where the workpiece is especially sensitive to handling, clamping or cutting forces as in the case of tapered foils.

The fourth method comprises chemical milling of rolled sheet to a tapered configuration by controlled exposure of the sheet to etchants or the like. This process is also slow and tedious, therefore costly and poorly suited to mass production. Moreover, the contaminating effect of chemicals used in metal removal presents troublesome problems in handling workpieces and in eliminating residual contamination from equipment as well as from workpieces.

BRIEF SUMMARY OF INVENTION

Referring to the drawings, FIG. 1 shows an elongate plate or panel 10 having a uniformly tapered thickness and comprising a solid unitary mass of uniform strength and homogeneous metallurgical properties. Plate 10 is formed by stacking a plurality of workpiece elements such as sheets 12, 14, 16, 18, and 20 in the relationship suggested by FIG. 2 within a confining yoke 22 together with filler members such as 24, and rolling the workpack thus formed at a high temperature sufficient to join the workpiece elements together by solid state diffusion bonding. A generally similar technique is used to form workpiece 30 shown in FIG. 3 having stiffening webs 62 thereon as suggested by FIGS 4–7.

DETAILED DESCRIPTION OF INVENTION

Figure 1:
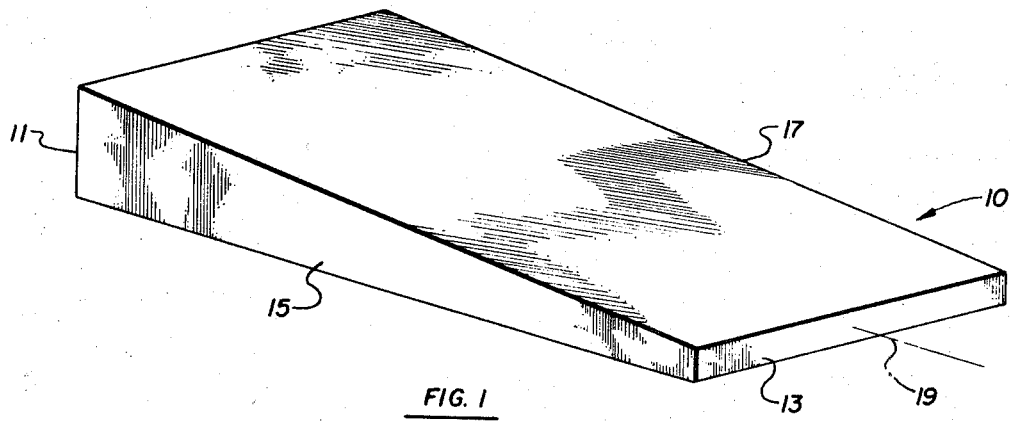
FIG. 1 shows a general perspective view of a workpiece of the type which can be formed using the inventive principles disclosed herein.

The inventive method disclosed herein is adapted for mass production for workpieces generally involving nonuniform thickness portions such as tapered sheets or plates, and of diverse sizes and configurations. FIG. 1 illustratively shows elongate plate or panel 10 having a thickness diminishing at a substantially uniform rate from a maximum thickness at end portion 11 to a minimum at end portion 13. Plate 10 is a solid unitary mass having substantially parallel sides 15 and 17 equidistantly spaced from an imaginary center longitudinal axis 19 extending between ends 11 and 13. It will be understood that the structure shown in FIG. 1 is somewhat exaggerated for the sake of clarity, and that the workpiece in some applications of the inventive principles taught herein might be very long or wide and of relatively thin gage, and that edge 13 may be extremely thin compared with edge 11.

Figure 2:
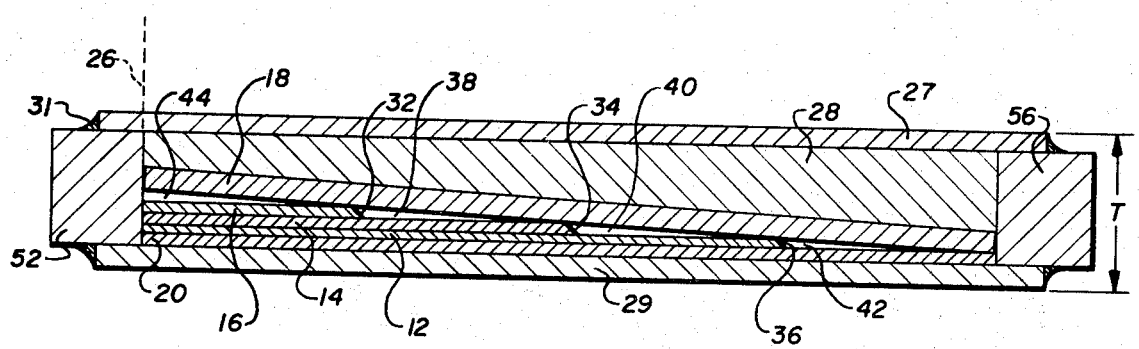
FIG. 2 shows a cross-sectional view taken through a workpack comprising the workpiece elements and tooling members required to produce the structure shown in FIG. 1.

Plate 10 is formed by initially arranging a plurality of thin sheet or plate-like elements in a laminar stack as suggested in FIG. 2. Thus, inner elements 12, 14, and 16 each have substantially parallel surfaces constituting faying surfaces which are joined during the solid state bonding operation discussed below. In addition, outer covering workpiece elements 18 and 20 overlie and underlie inner elements 12, 14, and 16, respectively, and form the upper and lower surfaces of the finished workpiece. All of the elements 12–20 shown in FIG. 2 have end portions lying in a common plane suggested by line 26. The end of each element 12, 14, and 16 opposite from that lying in plane 26 extends a successively greater distance from the mentioned plane from the top to the bottom of the laminar stack, and terminates in a beveled edge as indicated by reference numerals 32, 34, and 36. The size and number of inner elements between covering sheets 18 and 20 may vary depending upon the maximum thickness and the amount of taper desired in the finished workpiece. A sufficient number of inner laminae such as 12, 14, and 16 as required to occupy substantially all of the volumetric content defined by angularly disposed cover sheets 18 and 20 should preferably be used.

Sheets 18 and 20 contact each other at the end thereof opposite from plane 26 and diverge an increasing amount from the place of mutual contact toward plane 26. Beveled edges 32, 34, and 36 aid the flow of metal into void spaces 38, 40, and 42, respectively, during the rolling operation. The angle of the stated bevel may vary, but a bevel of from 25 to 45 degrees is preferred. The length of each stepped sheet 12, 14, and 16 and the number steps or laminae used to form finished workpiece 10 will depend upon the size of the finished workpiece and degree of taper desired. The thickness of workpiece elements 12–20 shown in FIG. 2 will also vary, depending upon the final thickness dimensions desired and the amount of reduction in overall thickness T of the workpack shown in FIG. 2 during the reduction rolling operation. The thickness of covering sheet 18 is greater than that of any other of the workpiece elements used in forming workpiece 10, due to the fact that material in element 18 is used to fill void 38, 40, 42, and 44. The thickness of sheet 18 will thus depend upon the volumetric content of the mentioned void spaces. As a general rule broadly applicable to workpiece arrangements typical of that illustratively shown in FIG. 2, for example, the volumetric content of sheet 18 should be approximately 3 to 7 times the combined total of volumetric content of voids 38, 40, 42, and 44, with a preferred ratio of about 5 times greater.

Fabrication of workpiece 10 shown by FIG. 1 begins with preplacement of workpiece elements 12 through 20 within a confining mass or yoke 22 and arranged as shown in FIG. 2 and disclosed above. Yoke 22 is relatively massive so that no deformation either laterally or elongationally of the workpiece can occur unless accompanied or preceded by corresponding deformation of the yoke during reduction rolling of the complete workpack. Yoke 22 in FIG. 2 is further shown in FIGS. 4–7, and has a hollow rectangular cavity in the center thereof defined by the inner surfaces of the four side portions designated 52, 54, 56, and 58 in FIG. 7, for example. The foregoing cavity should be substantially fully occupied by the workpiece and by the filler metal elements which are intended to undergo reduction rolling, hence it is advantageous for the height of side portions 52, 54, 56, and 58 to be substantially uniform, and for the inward facing surfaces of all the mentioned portions to be substantially uniformly planar.

In the case suggested by FIG. 2, a tooling member 28 of plate-like form having tapered thickness is preplaced within the workpack related to workpiece elements 12–20 in such a manner as to result in substantially uniform thickness of the assembled components within the cavity formed by yoke 22. Covering sheets 27 and 29 are placed over and under the yoke and welded thereto as suggested by fillet welds 31 to enclose all of the workpiece and filler elements and to isolate the same from surrounding atmosphere. Appropriate means such as external tube or conduit 33 are provided for connection with an external source of vacuum (not shown) in order to evacuate atmosphere from within the workpack prior to the rolling operation.

Following completion of the steps discussed above, the workpack thus formed, including yoke 22, covering members 27 and 29, and the entire contents thereof, are subjected to heating by suitable means such as a furnace. Rolling operations on the workpack which comprises all the structure shown by FIG. 2, for example, are then performed, during which the workpack thickness may be reduced as much as 60% or more, referring to the initial thickness indicated by dimension T in FIG. 2 compared with the final thickness after rolling. The extreme roller compression forces and accompanying elevated temperature to which the workpack is subjected produce solid state diffusion bonding between workpiece elements 12–20 and are accompanied by deformation of the workpiece materials whereby metal primarily from element 18 flows into and fully occupies 38, 20, 42, and 44. Following the rolling operations, cutting or other appropriate operations are performed as necessary to remove the finished workpiece 10 from within the envelope formed by mentioned items 22, 27, and 29, and to separate the same from filler member 28.

Although the selection of particular materials in practicing the novel method disclosed herein is not critical to use of the inventive concept, filler and envelope materials used for items 22, 27, 28, or 90 and 29 are selected for use with particular workpiece materials so as to have compression characteristics generally corresponding to those associated with such workpiece materials at the temperatures associated with the rolling operation. Illustratively, where the workpiece components comprise titanium, the filler metal and envelope materials may comprise mild steel. Moreover, the selection of tooling material is preferably calculated to avoid strong diffusion bonds between the filler and workpiece materials so as to permit removal of workpiece 10 after the bonding operation.

Figure 3:
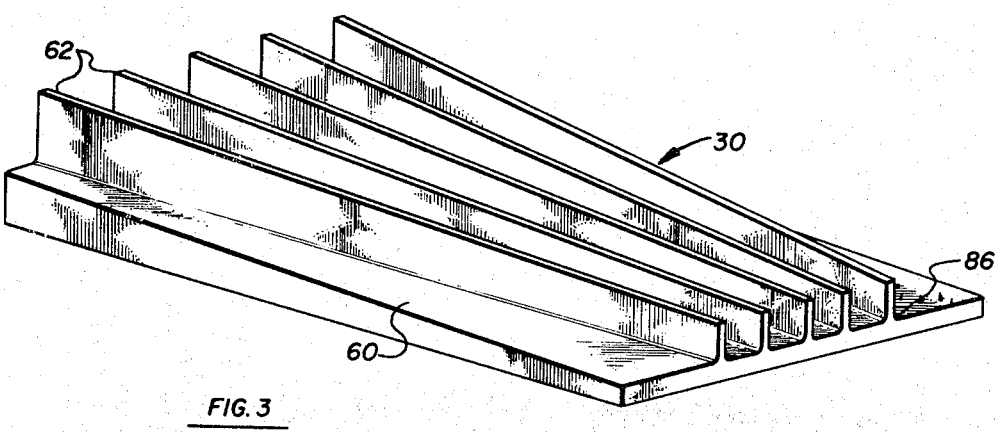
FIG. 3 shows another tapered workpiece formable by the inventive process disclosed herein.

As mentioned briefly hereinabove, the technique discussed hereinabove for fabrication of workpiece 10 in FIG. 1 is also applicable to fabrication of web or rib reinforced tapered workpieces such as illustratively shown in FIG. 3 and generally designated by reference numeral 30. Workpiece 30 comprises a tapered plate or sheet portion 60 and a plurality of upstanding projections 62 in the form of stiffening webs or ribs characterized by diminishing height from a maximum at one end thereof to a minimum at the opposite end thereof. Thus, plate 60 corresponds essentially with workpiece 10 shown in FIG. 1, and webs 62 have their greatest height at the end of workpiece 30 characterized by maximum thickness of plate portion 60. Upstanding ribs 62 are integrally formed on plate portion 60 and may be, as in the illustrative case suggested by FIG. 3, not parallel to each other but spaced apart a maximum distance at the thicker end of plate portion 60, converging to a minimum spacing distance in the manner shown.

Referring to FIGS. 4–7, fabrication of workpiece 30 appropriately begins by preplacement of workpiece components within yoke 22 together with filler elements, followed by furnace heating and reduction rolling operations in the manner discussed above in connection with FIG. 2. Thus, separate sheets or plates of varying length are arranged in a laminar stack as suggested by workpiece elements 70, 72, 74, and 76 in FIG. 4. The sheets have one edge thereof situated in a common plane, and the stepped edges thereof preferably beveled at a convenient angle such as 45 degrees. The laminar stack thus formed is sandwiched between covering sheets 78 and 80 shown in FIG. 4 in the same general manner as covering sheets 18 and 20 in FIG. 2. In addition, a plurality of separate workpiece elements in the form of tapered strips or sheets 82 are arranged in desired final relationship with the aforementioned workpiece elements forming plate portion 60 as suggested in FIG. 5. Strips 82 contact bottom sheet 80 and are joined thereto by the bonding operation to form webs 62 of the final workpiece 30. A plurality of tapered mandrels 84 comprising filler metal are arranged in supporting relationship between webs 82 as seen particularly in FIGS. 5 and 6. Mandrels 84 are rounded at the corners thereof proximate sheet 80 in order to form voids at each of the locations where strips 82 join the mentioned cover sheet whereby displacement of workpiece material during the bonding operation fills the mentioned voids and forms a fillet on each side of the mentioned joint as examplified by fillet 86 seen in FIG. 3. Additional workpiece material used in filling the mentioned voids resulting from rounded corners on mandrels 84 is provided in the form of elongate filler rods or wires 88 at each of the locations where the stated fillets are desired. It will be seen that the envelope portions including yoke 22 and cover sheets 27 and 29 are omitted from FIG. 6 for the sake of clarity, the structure shown therein comprising only those elements within the cavity of yoke 22 below lower cover sheet 80. Instead of rods 88, workpiece material for forming fillets 86 may be provided by oversizing strips 82 in the manner suggested by FIG. 8, whereby rods 88 may be omitted.

Figure 4:
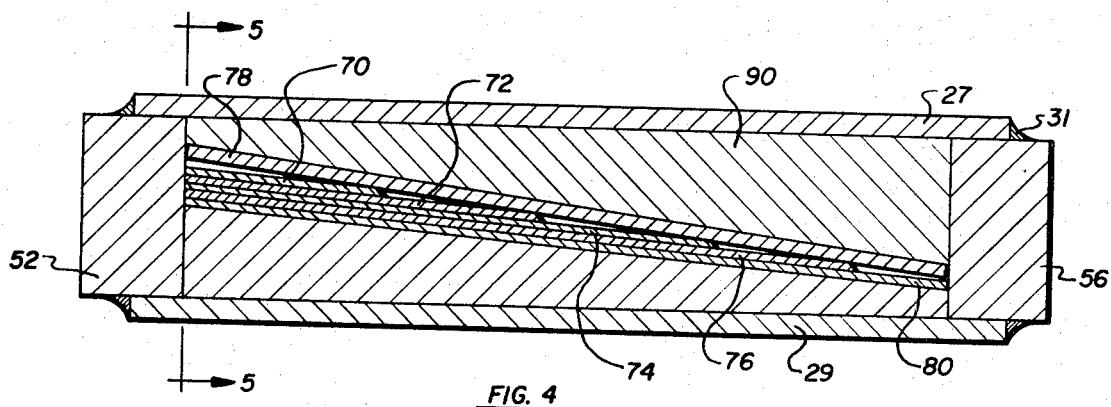
FIG. 4 shows a cross-sectional view taken through a workpack comprising workpiece elements and tooling members required to produce the structure shown in FIG. 3.
Figure 5:
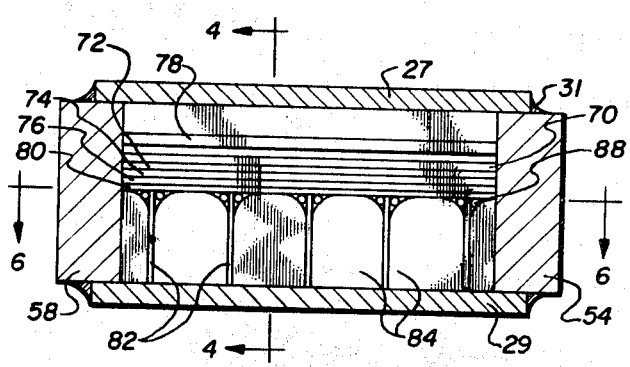
FIG. 5 shows an end view, partly in cross section, taken along line 5—5 of the structure shown in FIG. 4.
Figure 6:
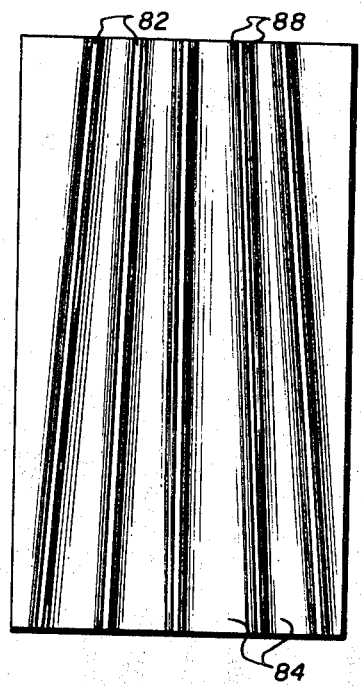
FIG. 6 shows a top plan view of the workpack contents in the structure shown by FIGS. 4 and 5 taken along line 6—6 of FIG. 5 and omitting portions of tooling items therefrom for the sake of clarity.
Figure 7:
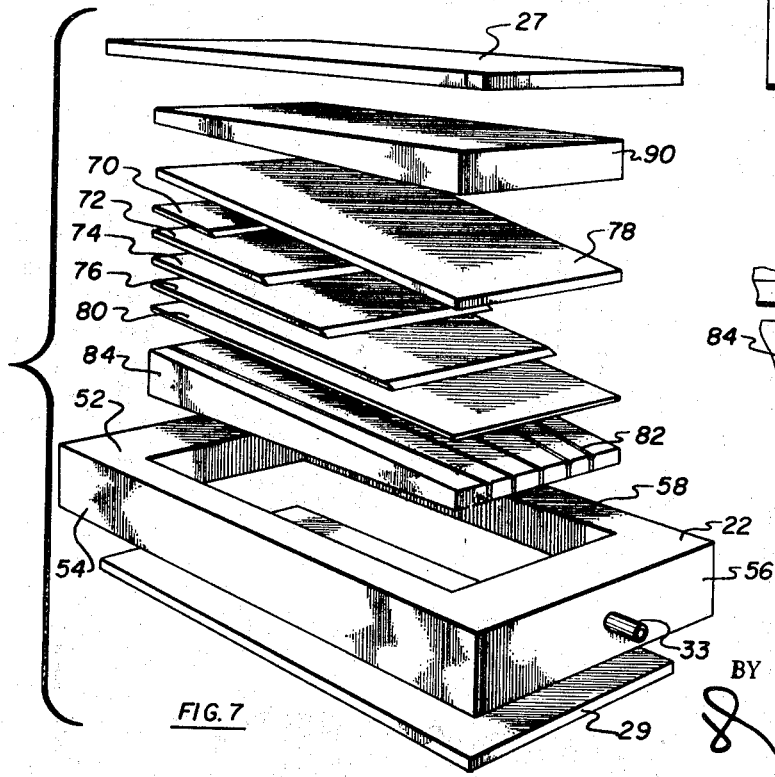
FIG. 7 shows a general perspective view of the workpiece and tooling components in exploded form of the structure shown in FIGS. 4–6.
Figure 8:
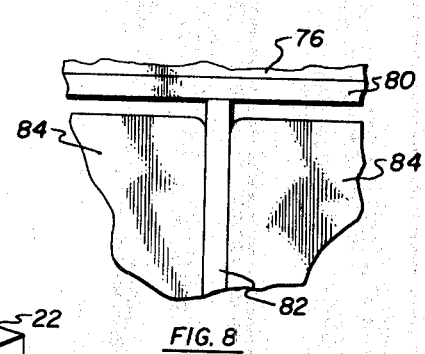
FIG. 8 shows an isolated view of a structural detail representing a modification of the structure shown in FIG. 7.

As further seen from FIGS. 4, 5, and 7, a tapered mandrel plate 90 of filler metal is preplaced within yoke 22 to result in uniform thickness of all the assembled components within the mentioned cavity. Following initial assembly of the workpiece elements in desired final relationship and supported by filler metal members 84 and 90 within the center cavity of yoke 22, cover sheets 27 and 29 are joined to the yoke as suggested by FIGS. 4, 5, and 7, to form an airtight envelope or retort which is evacuated by suitable means such as conduit 33 connected to a source of vacuum (not shown). Following complete evacuation of the workpack thus formed, conduit 33 may be closed by suitable means such as crimping or welding, and the workpack is thereafter heated by suitable means such as in a furnace and then subject to reduction rolling by one or more passes through rollers to reduce the thickness thereof by deformation of all components in the workpack. The rolling process thus contemplated is generally similar to that suggested in U.S. Pat. 2,851,770 issued Sept. 16, 1958 and involving ribbed structure of the general type suggested by workpiece 30 in FIG. 3 in the accompanying drawings.

As in the case of workpiece 10 discussed above, the length of each stepped sheet or workpiece element 70, 72, 74, and 76, as well as the number thereof between cover sheets 78 and 80 shown in FIG. 4, for example, will depend upon the particular degree of taper desired and the maximum and minimum thicknesses of the final workpiece 30 produced by the method and structure suggested in FIGS. 4–7. Similarly, the thickness of cover plate 78 in the initial layup of workpiece components will depend upon the unoccupied volume of the voids formed by the rounded portions of mandrel 84, keeping in mind that some of the volumetric content in such voids is occupied by filler metal rods 88 in the modification shown by FIG. 7, for example, and by strips 82 in that shown by FIG. 8.

It will be understood that the inventive concept in this case may be practiced with a wide variation of metals and alloys, both for the workpiece and the filler materials, and that the parameters for achieving solid state diffusion bonding will necessarily vary for each particular choice of such materials. Among the metals or alloys which may be joined by solid state diffusion bonding are aluminum, stainless steel, titanium, nickel, tantalum, molybdenum, zirconium, and columbium or their alloys. Diffusion bonding is characterized by intermolecular exchange between contacting surfaces of the workpiece at suitable pressure and at temperatures below the melting point of the materials. In some cases, a thin interleaf material, or eutectic former, is provided while in other forms of solid state bonding no interleaf material is required. The prior art, involving solid state or intermolecular diffusion bonding includes issued Pats. 3,145,466; 3,180,022; 3,044,160; 2,850,798; and 3,170,234. The precise values of time, temperature and pressure utilized in connected with bonding workpiece materials is not a critical or limiting feature of the broad concept disclosed herein but specific materials with which the concept is usable are stated for illustration only. Thus, for example, if workpiece 10 or 30 is titanium, solid state bonding thereof may be achieved under coordinated time-temperature-pressure conditions of about 1500° F. and sufficient compressive force to cause about 10% reduction of workpack thickness for each pass thereof through the rollers. Where the workpiece material is titanium, mild steel is preferably used in yoke 22, cover plates 27 and 29, filler metal members 28 and 90, and tapered mandrels 84. The foregoing selection of materials facilitates separation of the workpiece from filler metal and other workpack elements due to the inherent failure of titanium and many of its alloys to form permanent diffusion bonds with steel. Workpieces conforming with that shown in FIG. 3 were successfuly fabricated where elements 70, 72, 74, and 76 were .050-inch-thick sheets of Ti–6AL–4V titanium alloy, and cover sheet 78 was 0.125 inch thick of the same alloy material. Lower sheet 80 and webs 82 were also .050-inch-thick sheets of the mentioned titanium alloy. After the rolling operation, plate portion 60 of workpieces 30 was 21 inches long and tapered from a maximum thickness of 0.153 inch at one end thereof to a minimum of .070 inch at the opposite end thereof, with a uniform rate of thickness change therebetween.

The foregoing workpieces were reduction hot rolled at a workpack temperature of between 1700° F. and 1750° F., and a plurality of successive passes were made to effect a total workpack thickness reduction of about 60%.

During the rolling operation, one or more passes, or a single pass through a succession of gang rollers, may be made with one or more intermediate heating steps accomplished between the passes. Although the thickness reduction may illustratively amount to approximately 10% with each pass, the total reduction of workpack thickness should preferably exceed 40%, with best results between 60% and 80%. Below about 40% reduction of thickness, diffusion bonding of the workpiece elements may in some cases be incomplete due to insufficient pressure application to the same. The precise temperature value of the workpiece during the rolling operation will depend upon the amount of force necessary to achieve the desired thickness reduction and the duration of the rolling process. In any case, the temperature must be sufficient to result in solid state diffusion bonding of the particular metal or alloy used in the workpiece elements. The limiting factor in most cases is the amount of compressive force which can safely be applied by the rollers, since every steel mill has certain performance limitations. Due to the higher strength of workpieces at lower temperature values, it is less wearing on rolling mill apparatus if the workpack is heated at least to 1500° F. Specimens conforming generally to that shown in FIG. 1 of this case, for example, and comprising a titanium alloy of about 8% aluminum, 1% molybdenum, 1% vanadium, and the balance essentially titanium, were hot rolled at a temperature of 1835° F. using low carbon steel filler metal and envelope elements.

From the disclosure set forth above, it will be understood that the initial layup involved in this case comprises the forming of elongate sheets such as items 70 through 76 in a wedge-shaped laminar stack with one end of each sheet being substantially coplanar with each other and with cover sheets 78 and 80 as suggested in the view shown in FIG. 4, for example. Elongate mandrels 84 and 90 seen in FIGS. 5 and 7, for example, are also wedge-shaped and form, together with all of the workpiece elements within yoke 2, a workpack of substantially uniform thickness. Moreover, as seen particularly from FIG. 2, the laminar stack formed by workpiece elements 12, 14, and 16, for example, may be seen to be substantially parallel to an imaginary reference datum coinciding with the lower surface of member 29, and that the plane defined by line 26 in the same figure is normal to such reference datum.

We claim:
1. In a method of making a solid unitary tapered plate-like workpiece from a plurality of separate workpiece sheets, the steps of:
   assembling in generally wedge-shaped relationship a pair of elongate cover sheets with one end of each said cover sheet being in close mutual proximity and the other end of each said cover sheet being substantially mutually coplanar and spaced apart,
   assembling between said cover sheets a generally wedge-shaped laminar stack of inner sheets having unequal lengths, each of said inner sheets having one end thereof coplanar with said spaced apart ends of said cover sheets, placing a wedge-shaped elongate mandrel in substantially complete area contact with one of said cover sheets, said mandrel having a tapered thickness to form with said cover sheets and said inner sheets a composite layup of substantially uniform thickness, surrounding said layup with an airtight envelope to form a workpack of uniform thickness, reduction hot rolling said workpack to reduce said uniform thickness by deformation of said workpack while maintaining said workpack at a temperature sufficient to cause solid state diffusion bonding of said cover sheets and said inner sheets to each other during said reduction of thickness, and thereafter removing said solid unitary tapered plate-like workpiece from said workpack.

2. The method set forth in claim 1 above, where:

said laminar stack of inner sheets intermittently contacts one of said cover sheets whereby volumetric voids results in said workpack, and said one cover sheet in said composite layup has a volumetric content at least three time greater than the volumetric content of said voids.

3. The method set forth in claim 1 above, further including:

the step of providing each of said inner sheets with a beveled end opposite from said coplanar ends.

4. The method set forth in claim 1 above, further including the steps of:

arranging a plurality of spaced-apart reinforcing ribs in said workpack, and preplacing a mandrel between each of said spaced-apart ribs to support said ribs substantially normal to said laminar stack and closely proximate one of said cover sheets, whereby said reduction hot rolling of said workpack results in solid state diffusion bonding of said ribs to said tapered plate-like workpiece.

5. A method of fabricating an elongate plate-like solid unitary specimen of nonuniform thickness tapering from a maximum height at one end to a minimum height at the other end thereof relative to a horizontal reference datum, said method comprising:

arranging a plurality of sheets in a laminar stack with each of said sheets parallel to said reference datum and with one edge of each sheet in substantially coplanar relationship with the remainder of said sheets, said sheets extending a successively shorter distance from said coplanar edges from the bottom to the top of said laminar stack relative to said reference datum, arranging a pair of angularly disposed cover sheets, each having substantially uniform thickness, one above and one below said laminar stack relative to said reference datum, said cover sheets converging toward each other from a maximum spaced apart distance proximate said coplanar edges to close mutual proximity remote from said coplanar edges, placing at least one tapered filler metal member in contact with at least one of said cover sheets to form a composite layup of substantially uniform thickness, enclosing said layup in an airtight envelope, evacuating atmospheric content from said envelope, heating said envelope and its contents to a temperature sufficient to effect solid state diffusion bonding of said sheets at a predetermined rolling pressure above the compressive yield strength of said sheets, and passing said heated envelope and contents between rollers to apply said pressure progressively reducing said thickness of said envelope and contents by deformation thereof.

6. In a method making a solid unitary tapered plate-like titanium workpiece from a plurality of separate workpiece sheets, the steps of:

assembling in generally wedge-shaped relationship a pair of elongate titanium cover sheets with one end of each said cover sheet being in close mutual proximity and the other end of each said cover sheet being substantially mutually coplanar and spaced apart, assembling between said cover sheets a generally wedge-shaped laminar stack of inner sheets having unequal lengths, each of said inner sheets comprising titanium and having one end thereof coplanar with said spaced apart ends of said cover sheets, placing a wedge-shaped elongate steel mandrel in substantially complete area contact with one of said cover sheets, said steel mandrel having a tapered thickness to form with said cover sheets and said inner sheets a composite layup of substantially uniform thickness, surrounding said mandrel, said cover sheets and said inner sheets with an airtight steel envelope to form a workpack of uniform thickness, reduction hot rolling said workpack to reduce said uniform thickness at least 50% by deformation of said workpack while maintaining said workpack at a temperature of about 1700° F. to cause solid state diffusion bonding of said cover sheets and said inner sheets to each other during said reduction of thickness, and thereafter removing said solid unitary tapered plate-like workpiece from said workpack.

References Cited

UNITED STATES PATENTS

| | | | |
|---|---|---|---|
| 3,427,706 | 2/1969 | Jaffee | 29—497.5 XR |
| 3,444,608 | 5/1969 | Conn et al. | 29—497.5 XR |
| 3,447,231 | 6/1969 | Jaffee | 29—497.5 XR |
| 3,453,717 | 7/1969 | Pfaffenberger et al. | 29—497.5 XR |
| 3,460,232 | 8/1969 | Pfaffenberger et al. | 29—497.5 XR |

JOHN F. CAMPBELL, Primary Examiner

R. B. LAZARUS, Assistant Examiner

U.S. Cl. X.R.

29—472.3, 475, 493